United States Patent [19]

Lawrence et al.

[11] Patent Number: 4,769,147

[45] Date of Patent: Sep. 6, 1988

[54] OIL RECLAMATION APPARATUS

[75] Inventors: William L. Lawrence; Robert D. Coyle, both of Louisville; Ronald G. Rose, New Castle, all of Ky.

[73] Assignee: Opcon Inc., Louisville, Ky.

[21] Appl. No.: 800,208

[22] Filed: Nov. 21, 1985

[51] Int. Cl.$^4$ ............................................. B01D 35/30
[52] U.S. Cl. ..................................... 210/350; 210/437
[58] Field of Search ............... 210/671, 799, 350, 693, 210/708, 774, 792, 804, 181, 351

[56] References Cited

U.S. PATENT DOCUMENTS

| | | | |
|---|---|---|---|
| 1,569,695 | 1/1926 | Zoul | 210/181 |
| 2,546,269 | 3/1951 | Lovelady | 210/181 |
| 2,937,977 | 5/1960 | Topol | 210/DIG. 5 |
| 3,617,551 | 11/1971 | Johnston | 210/671 |
| 4,022,694 | 5/1977 | Fruman | 210/350 |
| 4,093,548 | 6/1978 | Sterkenburg et al. | 210/350 |
| 4,411,791 | 10/1983 | Ward | 210/799 |
| 4,493,772 | 1/1985 | Tanaka | 210/799 |

Primary Examiner—Richard V. Fisher
Assistant Examiner—Richard D. Jordan
Attorney, Agent, or Firm—Edward M. Steutermann

[57] ABSTRACT

Method and apparatus for purification of liquids, particularly hydrophobic oil-water emulsions which includes heating the emulsified liquid to a process temperature where accelerated stratification occurs and passing the fluid through a fiberous media which is maintained at a selected compressed condition which allows flow through the media to separate the oil and water phases. Additionally, within the scope of the present invention organic fluids containing significant amounts of water can be heated utilizing a vacuum in order to reduce the water content to the range of 0 to as much as 8% prior to passage through the media at the process temperature.

1 Claim, 2 Drawing Sheets

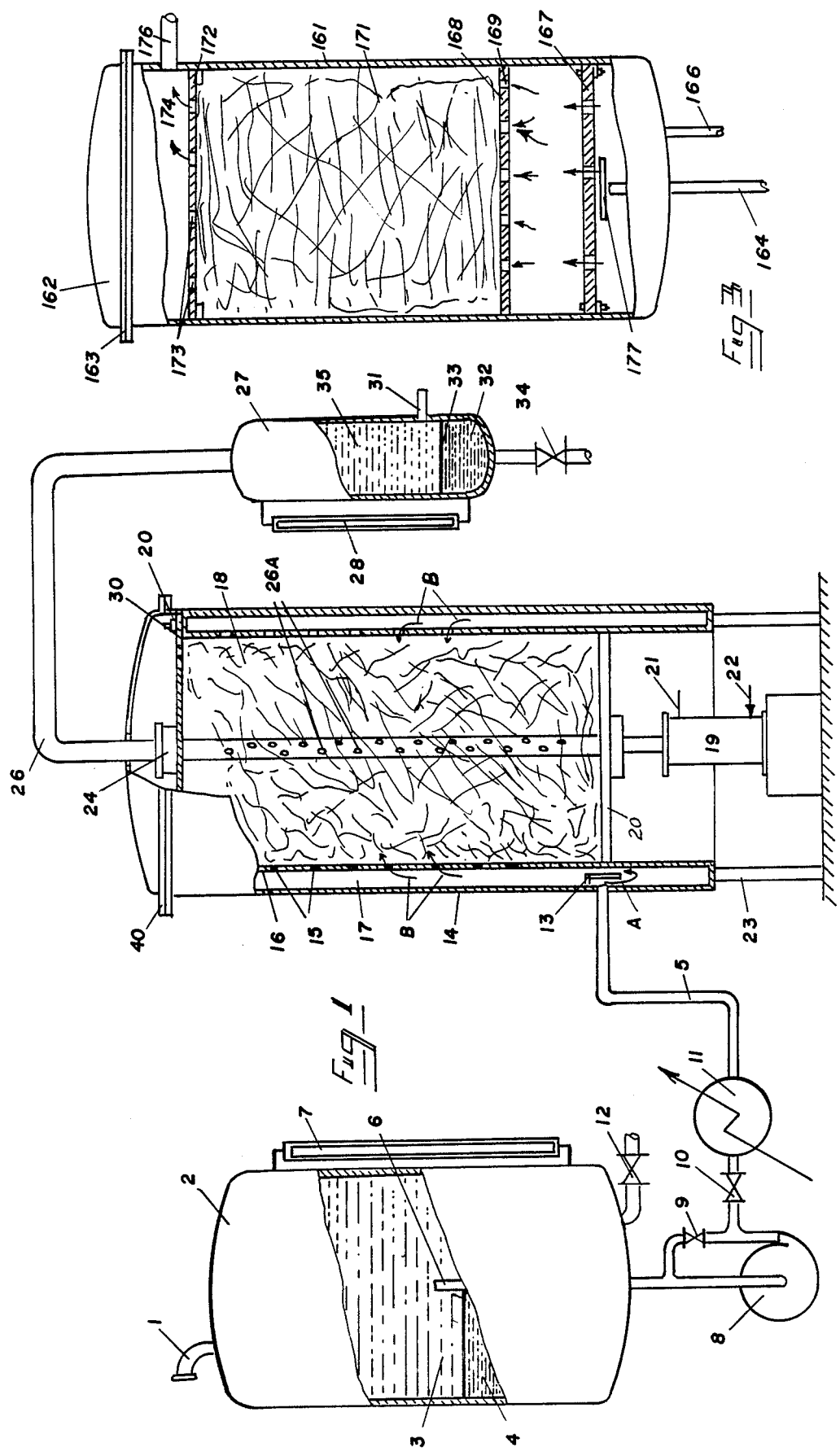

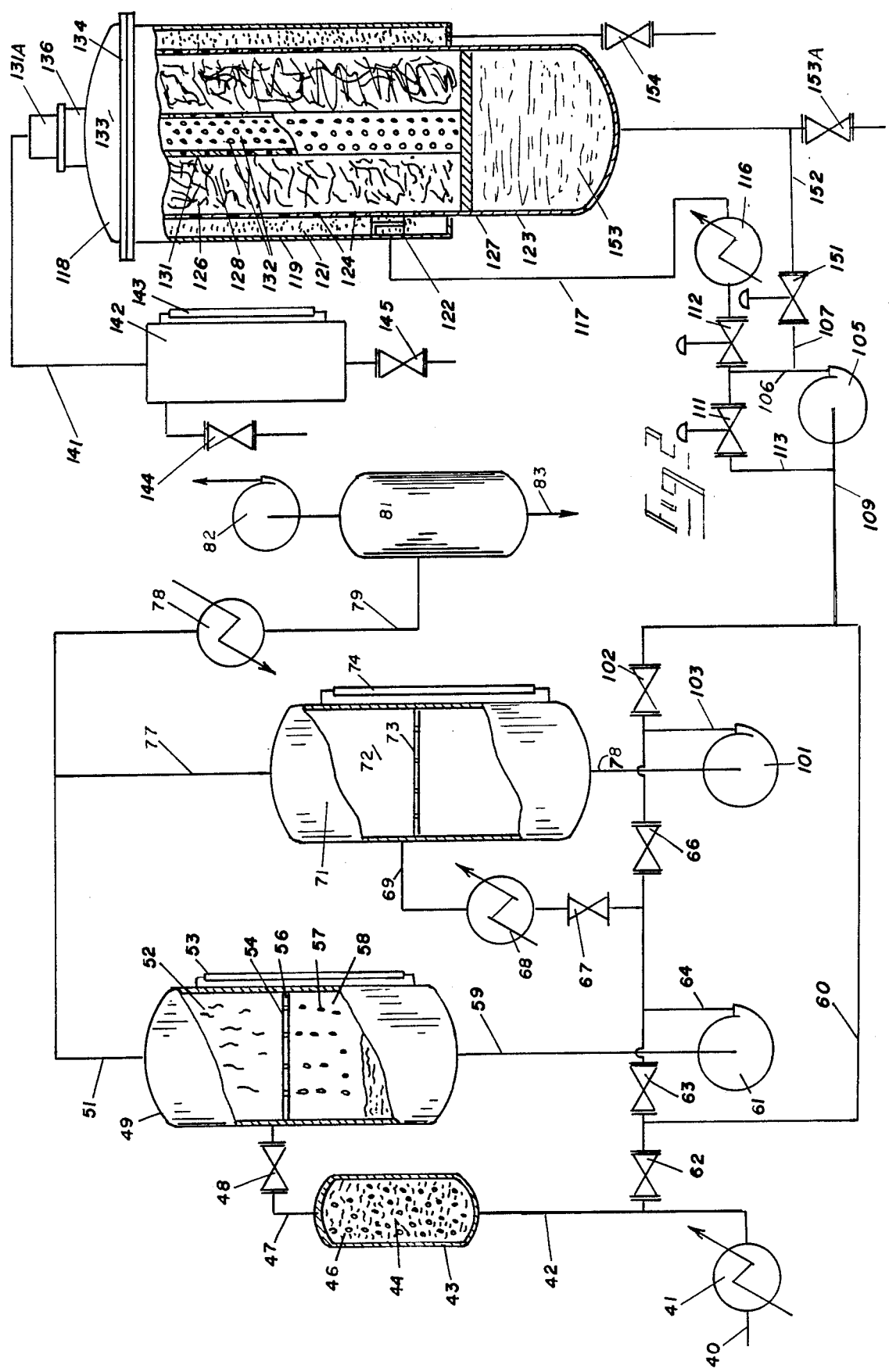

OIL RECLAMATION APPARATUS

BACKGROUND OF THE INVENTION

The present invention relates to methods of cleaning fluids and removing water from hydrophobic liquid and water emulsions.

While the invention is described in terms of reclamation of oils it will be understood that the method and apparatus provided herein is equally satisfactory for the reclamation of other hydrophobic liquids from oil emulsions to permit reuse of the liquid.

Heretofore, the majority of the methods utilized in the reclamation of oil have required extensive handling procedures, preparation procedures, and in some instances complex operating procedures using expensive equipment. Such prior art procedures have been labor intensive, and have generated excessive amounts of by-product. The by-products resulting from the prior art procedures have generally been difficult to dispose of because of ecological considerations and environmental regulations and therefore added to the processing expense.

While some prior art methods are known utilizing procedures where emulsions are passed through media as a mode of reclamation such as in U.S. Pat. Nos. 2,937,977 and 4,406,791, the prior art methods have been limited in the types of fluids that can be processed, generally generate large amounts of unconcentrated waste solids, and have not taught the procedures provided by the present invention where the media is compressed then the liquid passed through. Further such procedures have not suggested processing emulsions at temperatures of the oil where accelerated stratification occurs.

Other well known prior art methods of removing water from emulsions with hydrophobic oils include absorption on solid materials in fixed and fluidized beds, distillation processes, evaporation processes as shown also in U.S. Pat. No. 2,937,977, centrifugation as shown in U.S. Pat. No. 3,972,816 and clarification operations.

In some instances even decanting procedures as shown in U.S. Pat. No. 4,243,528 are used where in some applications addition of acid is used to attempt to break emulsions so the water can be separated from the oil by decantation. The use of acids further increases the processing cost and adds other materials which require additional procedures and expense to dispose of the acid waste.

In general, the aforenoted methods are labor intensive, and require, in some instances expensive equipment. In general they also require the use of significant energy and are not entirely satisfactory.

No prior art method or arrangement is known which falls within the scope of the present invention wherein a synergistic effect is established between the characteristics of the material to be reclaimed, the temperature of the emulsion during reclamation, the concentration of water in the material to be reclaimed and the compressive characteristics of the media utilized in the reclamation.

SUMMARY OF THE INVENTION

The present invention relates to a new and useful method for reclaiming certain hydrophobic liquids such as organic oils from water emulsions and provides solutions to many of the critical problems associated with prior art methods which have proved unsatisfactory or too expensive.

Principally, methods within the scope of the present invention require very little capital expenditure in the way of equipment, are not labor intensive and do not generate large quanities of toxic or other materials which must be disposed of at great expense.

Additionally, an advantage of the present invention resides in the fact that it provides effective procedures which are not energy intensive so that the energy cost associated with the procedures and operation of the devices in accordance with the present invention is significantly less than in previous methods. Processes and methods within the scope of the present invention effectively and efficiently remove water from hydrophobic liquid - water emulsions while simultaneously removing selected contaminants from the liquid depending upon the selection of the media utilized.

Further, the processes within the scope of the present invention do not damage, destroy, or alter the original properties of the hydrophobic liquid so that in most instances the reclaimed liquid is of equal character with the material which was initially produced. In fact, in some instances the processed reclaimed liquid is more stable than the original material.

More particularly, the present invention provides a method and apparatus for purification of liquids, particularly hydrophobic oil - water emulsions which includes heating the emulsion to a selected processing temperature where accelerated stratification occurs and passing the fluid through a media which is maintained at a selected compressed condition which allows flow through the media. Additionally, within the scope of the present invention organic fluids containing heavy amounts of water can be heated utilizing a vacuum and heated in order to reduce the water content to the range of 0 to 8% prior to passage through the media.

Examples of methods and procedures within the scope of the present invention are illustrated in the accompanying drawings and described hereinafter, it being understood that neither the drawings nor the description hereinafter is by way of limitation, but are presented as examples only.

BRIEF DESCRIPTION OF THE DRAWINGS

FIG. 1 is a schematic illustration of one process within the scope of the present invention;

FIG. 2 is an illustration of another method and process and apparatus within the scope of the present invention; and FIG. 3 is a schematic illustration of yet another apparatus and method within the scope of the present invention.

DETAILED DESCRIPTION OF THE DRAWINGS

FIG. 1 presents one arrangement within the scope of the present invention, where a vessel 2 is provided having an inlet 1 to receive oil water emulsion for separation.

In the arrangement shown there is a standpipe 6 provided in the tank to withdraw the oil water emulsion 3 from the tank. In a lower section 4 of the tank the standpipe extends above a phase separation line 3 so any free water which separates accumulates and can be drawn off by means of a valve 12. A sight glass 7 can be provided connected at the top and the bottom of the tank, as shown, to indicate any emulsion - water separation.

A pump 8 is provided to be connected to the standpipe 6 to receive the oil water emulsion and the pressure at the outlet of the pump is adjusted by means of control valves 9 and 10 which provide a selected fluid pressure to a heat exchanger 11 which is provided to selectively heat the emulsion prior to introduction to the separator 13 described hereinafter.

Devices as described in FIG. 1 and 3 operate satisfactorily on emulsion of water and hydrophobic oil up to about 8% water. In this range the viscosity of the material has certain characteristics while as the water concentration goes above a maximum of 8% additional treatments, also within the scope of the present invention, are used to facilitate processing and are described to hereinafter with reference to FIG. 2.

In either case the oil water emulsion is heated to a processing temperature range which has been found to be the temperature at which the emulsified oil begins accelerated stratification, that is the layers of dirt, water, and oil begin to form in the emulsion. This temperature can be determined empirically, by experimentation, and it has been found that the temperature can even be roughly calculated as described hereinafter.

In any event, it is the synergestic effect of the processing temperature to which the oil - water emulsion is heated and the character of the media through which the emulsion is passed which provides some of the characteristics of the subject invention.

Additionally it has been found that experimental determination of the point of accelerated stratification works satisfactory in relatively clear oils and that the location of the emulsion layers are dependent on percentage of emulsified water in the layer, that is, the greater the percentage of emulsified water the lower the layer forms.

In oil - water emulsions that are extremely dirty in some instances it becomes very difficult to visually observe the point of accelerated stratification. It has thus been unexpectedly found that the point at which the accelerated stratification occurs can be related to the pour point of the hydrophobic fluid. The approximate relation for determining this characteristic is and therefore the proper processing temperature in apparatus and method in accordance with the present invention is 100° F. plus the pour point in degrees F. of the hydrophobic oil. The relationship has been found to provide a good approximation for an initial processing temperature which than can be adjusted as the process continues.

Referring again to FIG. 1, the liquid is heated to the processing temperature in heat exchanger 11 and is then supplied to an annular chamber 17 located between an inner wall 16 which has apertures 15, and where the oil flows as shown by the arrows A and B.

The chamber 18 defined by the wall 16 is filled with fibrous media which can, in general include, shredded wood, cotton-wood mixtures, polyethylene fibers, teflon fibers, or other suitable fibers.

In some applications within the scope of the present invention it is advantageous if the fibrous material has an absorption characteristic with respect to various undesirable components of the oil, such as metals. In such instances the metal can be removed from the oil leaving an essentially metal free oil, or a oil having a greatly reduced metal content, and the metallic components are retained on the fiber which is a solid of relatively low volume and is easily disposed of.

In accordance with another feature of the present invention the fiberous media is compressed to a selected degree to provide proper separation characteristics between the hydrophobic oil and the water and to break the emulsion. For example, in some arrangements it has been found as low as ten pounds per square inch force exerted to compress the filter media provides satisfactory results. However, during the processing periodic adjustment of the pressure my be required to maintain satisfactory liquid separation.

Accordingly, in FIG. 1 a hydraulic cylinder 19 is provided having oil inlets and outlets 21 and 22 respectively to move a piston 20 up and down, within wall 16 to selectively compress media 18.

The structure 14 rests on legs 23 to allow room for the hydraulic cylinder which urges piston up and down depending upon the characteristics of the cylinder. A central tube 26 is provided having apertures 26A to receive the oil water emulsion or the mixture thereof which has passed through the media bed 18 for emission from the device. A seal 24 is provided at the top of the device as shown to allow vertical movement of tube 26 in response to movement of piston 20.

A separator plate 30 having a seal 24 for conduit 26 is located at the top of vessel 16 and is held in place by means of, for example, bolts 20. A flange 40 can be provided for removal of the head of the device to allow access to the inside for cleaning and removal of media if necessary.

The seal 24 allows operation of the device under selected pressure without loss of fluid and retains the fluid within chamber 18. The fluid which has passed through the media bed 18 is emitted through the conduit 26 to a separating tank 27 having a chamber where the liquids separate into an upper oil layer 35 which is withdrawn through an outlet 31 and lower layer 32 of water which is withdrawn through outlet 34. The separation line 33 is determined by means of a sight glass 28 which is provided on the side of the separation vessel 27.

FIG. 2 is a schematic illustration of another arrangement within the scope of the present invention and is particularly useful where the water concentration in the water oil emulsion is so high that the emulsion is highly viscous, and would typically be difficult to process. It has been found that in accordance with another feature of the present invention a two stage process, as illustrated in FIG. 2, can be utilized wherein water is initially removed from the material to provide an emulsion which can be satisfactorily utilized in processes within the scope of the present invention. Also as described hereinafter, a different compressive arrangement is provided to selectively compress the filter media for use in the process.

In FIG. 2 a heat exchanger 41 is provided, for example a steam heat exchanger, to receive a liquid emulsion to be processed and admitted to the heater by means of an inlet 40 where the liquid is then emitted, by means of an inlet/outlet 42 to a separator 43. In the heat exchanger 41, the liquid is heated to a processing temperature approximating the accelerated stratification temperature which, as previously noted, has been determined to depend upon several factors including pour point of the oil. In FIG. 2, the liquid in the separator 43 is illustrated as composed of oil drops 46 and water droplets 44. The vessel 43 is used principally to provide segregation time to allow the formation of the phases and the liquid is then emitted through outlet 47 at a rate determined by the setting of a valve 48 to a vacuum separator 49. Vacuum separator 49 is connected by a conduit 51 to a source of vacuum described hereinafter.

Tray 54 is provided transversely across the vessel 49 to divide the vessel into an upper chamber 52 and a lower chamber 58. A sight glass 53 can be provided. The temperature of the liquid admitted to the vessel 49, coupled with the vacuum applied through the conduit 51 causes vaporization of the water, which typically has a higher vapor pressure then the oil and the oil droplets 57 pass through apertures 56 of plate 54, as shown, to be received and accummulate in the bottom of receptacle 49. The sight glass is provided to be utilized to regulate the rate of admission of liquid to the vessel through the valve 48. Additionally, in the case of emulsions having extremely high water concentration, which may cause the vacuum system, described hereinafter, to approach its capacity, the valve 48 can also be utilized to limit the rate of inflow of the fluid to accommodate the vacuum system.

An outlet 59 is provided from the vessel 49 to a pump 61 which is provided to withdraw liquid from the vessel 49 through the conduit 59. The outlet 64 of pump 61 is connected to valves 63, 66 and 67. Valve 63 is connected to a by-pass line 60 and to a second valve 62 which can be utilized to recycle a portion of the processed liquid to the receptacle 43 in the event that it is necessary to decrease the water concentration of the material entering the vessel 49 because of limitations of the vacuum system or for other reasons.

Valve 67 is connected to an inlet to a second heat exchanger 68 having an outlet 69 which can be utilized as a second stage process for removal of additional water. Vessel 71 is provided with a tray 73 which defines an upper chamber 72 similar to chamber 52 of the vessel 49 and a sight glass 74 provided as shown. An outlet 78 can be provided to a pump 101 which connected to valve 66 which is closed when the recycling system provided by vessel 71 is in use and to a second valve 102.

Additionally as shown, vessel 71 has a vacuum outlet 77 which is connected into the vacuum system described hereinafter.

The vacuum system consists of a condenser 78 which receives the vaporous materials emitted through outlets 51 and 77 and condenses the heavier material, which is predominently water, and the condensate then flows through an outlet 79 to a separator 81. Separator 81 is provided to separate the liquid portion of the material emitted from the vessels 49 and 71. The liquid is emitted through an outlet 83 and the gasses are emitted through a vacuum pump 82 to the atmosphere or other disposal means.

Returning again to the processing of the liquid emitted from vessel 49, and in some cases vessel 71, liquid is supplied from outlet 64 through valves 66 and 102 or from the outlet 103 of pump 101 to a pump 105 which is provided to selectively increase the pressure of the liquid and supply it to the final separation stage described hereinafter.

It should be noted that the by-pass 60 is provided for processing liquid when vessels 49 and 71 are not needed to reduce the water concentration of the emulsions so that the material can be directed from inlet 40 through heat exchanger 41 where the liquid temperature is increased then through valve 62 to pump 105 without utilization of the vessels 49 and 71.

The pump 105 is provided with outlets 106 and 107. Outlet 106 is connected between control valves 111 and 112 which are pressure regulator valves. Valve 111 has an outlet 113 connected to the inlet 109 of pump 105 and is utilized to maintain a selected pressure at the outlet 106 of the pump 105. Liquid is supplied to valve 112 where the pressure is reduced to a selected value and the material passed through a heat exchanger 116 which reheats the liquid to the processing temperature approximating the optimum temperature of accelerated stratification of the liquid in process. The liquid is then supplied through an outlet 117 of heat exchanger 116 to a separator shown generally by the numeral 118. Separator 118 includes an outer shell 119 defining a plenum chamber 121 which receives the liquid from the inlet 117 where the liquid is initially directed against an impingement plate 122 similar to the plate 13 of the device shown in FIG. 1.

It will be noted that the operation of at least the upper portion of the device shown in FIG. 2 is similar to the operation of the device shown in FIG. 1 in that an inner shell 123 is provided having apertures 124 in the upper section thereof communicating with the plenum chamber 121 for emission of liquid to a chamber 126 defined within shell 123 above a movable plate 127 similar to the piston of the device of FIG. 1.

Chamber 126 is filled with media, of the type shown as media 18 in FIG. 1 and described hereinbefore which is compressible and fiberous.

A tube 131 is located within the chamber, carried by the plate 127 and has apertures 132 spaced therein to allow passage of liquid from the chamber 126 into the conduit 131. As previously described, a lid 133 is provided on the vessel 118 which can be removed by means of flange 134, and a seal 136 is provided to receive the end 131A of the tube 131 to allow movement of the tube in the vessel in response to movement of plate 127 where the liquid is passed through media 128 and tube 131. The liquid is then conducted by means of a conduit 141 to a separator 142 having a sight glass 143 where the oil and water portions of the liquid are separated. The oil portion is drawn off through a valve 144 and the water portion is drawn off through a valve 145.

In the arrangements shown, a second pressure reducing valve 151 is provided on the outlet 107 of the pump 105 and the pressure of the liquid emitted from valve 151 is selectively controlled to provide a selected pressure at outlet 152 which is supplied to a chamber 153 defined in the plate 127 to urge the plate upwardly to selectively lower portion of vessel 123 to exert a selected pressure on compress the media. A drain value 153A can also be provided.

The process and aparatus within the scope of the present invention can be utilized for many purposes, for example in processing oil for conversion into fuel oil or other purposes and have been successfully utilized in such applications, one example of the use of the device is illustrated by the data is shown in Table 1.

TABLE 1

| Test | New | Dirty | Processed |
| --- | --- | --- | --- |
| Viscosity, SSU at 100° F. | 165 | 652 | 194 |
| BS&W % | 0 | 3 | 0 |
| Zn, ppm | 245 | 192 | 19.2 |
| Ca | 5.3 | 15.7 | 14.4 |
| Mg | 1.9 | 6.5 | 6.3 |
| Fe | 27.5 | 883.9 | 205.7 |
| Pb | 0 | 50 | 4.3 |
| Cu | 8.18 | 509.4 | 68.1 |

TABLE 1-continued

| Test | New | Dirty | Processed |
|---|---|---|---|
| Cr | .3 | 9.4 | 1.3 |
| Ni | 0 | 311.9 | 72.7 |
| Ag | 1.26 | 18.66 | 3.57 |
| Na | 14.62 | 31.33 | 5.45 |

Table 1 represents data produced from processing an oil used in the manufacture of electrical components. New oil of the same type is known to have a viscosity of approximately 165 SSU with trace BS&W and minimal metal concentration. A batch of dirty oil containing water, which led to the high viscosity noted in the dirty oil, was processed in a device similar to that shown in FIGS. 1 and 2 and the result is illustrated in Table 1.

While various other useful arrangements within the scope of the present will be realized from the foregoing descriptions. FIG. 3 is an illustration of one other such arrangement. In FIG. 3 an arrangement is shown using a different means of media compression which involves the hydraulic pressure associated with the oil as a means of directly increasing the compression of the media. In FIG. 3, a dispersion plate 177 is shown in aligned relation with inlet 164 for emission of pressurized emulsion and a drain outlet 166 can also be provided. The emulsion passes upwardly through apertures in a tray 167 to and through apertures 169 in a second tray 168. The liquid impinges directly on media 171 contained within the vessel 161 and the media is compressed against an upper tray 172 which can be held in by bolts (not shown) for removal for cleaning and has apertures 173 to allow passage of process emulsion. The pressure exerted on the media 171 is in direct proportion to the flow and pressure of the liquid.

As also shown, a head 162 is provided and secured to the vessel 161 by means of a flange 163 where a liquid outlet 176 is also provided. Devices within the scope of the present invention as shown in FIG. 3 are useful in certain limited applications, but also have certain drawbacks principally that the operation of the device is extremely sensitive to the relationship of the inlet pressure and the flow rate. Accordingly, results have been found to be not as consistent as with externally related sources of media compression. Reduction of pressure increases the flow as the media decompresses relationship has not been found to be directly proportion except in isolated circumstances. Accordingly, devices of the type shown in FIG. 3 are useful only in limited circumstances.

It will be understood that the foregoing are but a few examples of arrangements and methods within the scope of the present invention and that various other arrangements and methods also within the scope of the present invention will occur to those skilled in the art upon reading the disclosure set forth hereinbefore.

The invention claimed is:

1. Apparatus for separating a hydrophobic oil-water emulsion including:
   (a) an enclosure defining a chamber to receive said oil-water emulsion having an inlet and fluid outlet wherein said enclosure is cylincrical shaped, has a closed endwall and where said fluid outlet is a conduit extending through said endwall moveable through seal means carried by said endwall;
   (b) a bidirectionally moveable wall within said enclosure to be moved within said enclosure to selectively adjust the volume of said chamber;
   (c) inner wall means extending around a portion of said enclosure in spaced relation from said enclosure to define an annular chamber where said fluid inlet communicates with said annular chamber and where said inner wall is perforated and, where said moveable wall is adapted for movement toward and away from said endwall and said moveable wall carries said fluid outlet; and
   (d) fibrous media located within said chamber to engage said moveable wall and be compressed by movement of said moveable wall.

* * * * *